April 12, 1955 R. N. RHODES ET AL 2,706,217

COLOR TELEVISION CONTROL APPARATUS

Filed Oct. 2, 1951 4 Sheets-Sheet 1

INVENTORS
ROLAND N. RHODES
& ALLEN A. BARCO

ATTORNEY

COLOR TELEVISION CONTROL APPARATUS

Filed Oct. 2, 1951 4 Sheets-Sheet 2

INVENTORS
ROLAND N. RHODES
& ALLEN A. BARCO
BY [signature]
ATTORNEY

INVENTORS
ROLAND N. RHODES
& ALLEN A. BARCO
BY [signature]
ATTORNEY

COLOR TELEVISION CONTROL APPARATUS

Filed Oct. 2, 1951 4 Sheets-Sheet 4

INVENTORS
ROLAND N. RHODES
& ALLEN A. BARCO
BY [signature]
ATTORNEY 2,706,217

COLOR TELEVISION CONTROL APPARATUS

Roland N. Rhodes, New Brunswick, and Allen A. Barco, Princeton, N. J., assignors to Radio Corporation of America, a corporation of Delaware Application October 2, 1951, Serial No. 249,268

12 Claims. (Cl. 178—5.4)

This invention relates to color television systems and particularly to color-controlling apparatus for use in that type of system in which a carrier wave is modulated in phase and amplitude to represent the color of a subject.

In a color television system operating in accordance with the well-known multiplex principle, video signals representing the total brightness of a subject are transmitted substantially in the usual manner for black and white video signals. Also, in a multiplex color television system, only the video signals representing the hue and chroma of the different elemental areas of the subject are transmitted. Both of these signal components are transmitted in the same channel having a fixed frequency band. This transmission is effected by the multiplexing process. In carrying out such a process, there is produced a phase- and amplitude-modulated color carrier wave having a nominal frequency within the frequency pass band of the channel. This color carrier wave is modulated both in phase and in amplitude to represent the color of the subject.

In order that only the modulation products be available for image reproduction, it is necessary to use balanced modulators or similar signal-transfer apparatus and/or band pass, and other types of, filters for the removal of the color carrier wave and the modulating signal components.

Accordingly, it is an object of this invention to provide, in a system in which the color information is conveyed on a sub-carrier wave having a frequency corresponding to a frequency in the brightness signal band, means by which to develop a composite video signal by suitably controlling the brightness information so as to enable a more faithful reproduction of a color subject.

Another object of the invention is to provide, in a system in which the brightness and color signals generally are conveyed in different channels within the same frequency band, means by which to suitably control the brightness signal conveyed within the color channel so as to simplify and generally improve the reproduction in color of a subject.

A further object of the invention is to produce signals representing the colors of a subject with proper chroma or saturation attributes in a color television system in which the color information is conveyed by a sub-carrier wave within the frequency band in which the brightness information also is conveyed.

In accordance with the present invention, the foregoing objects are achieved by the provision of apparatus whereby any undesired brightness information in the color channel is effectively removed in the formation of the composite video signal representing a subject color. This apparatus may be in any one of several different forms. In one embodiment of the invention a signal representing the total brightness of the colors in which the image is to be reproduced and having a frequency of the color carrier wave is developed and combined with the color-representative video signal-modulated carrier wave in a manner to cancel an equivalent brightness signal in the color channel. In order that the full range of detail capable of being transmitted over the transmission medium be available for image reproduction, a mixed highs signal is developed representing the brightness information in the range from the color carrier wave frequency to the upper frequency limit of the transmission medium. Such a mixed highs signal is added to the modulated color carrier wave signal which has been corrected by the bypassed brightness signal.

An alternative arrangement of such apparatus may be made in the case where, instead of balancing the brightness signal component produced in the modulated color carrier wave by the bypassed brightness signal down to the point required for the development of a color signal representing correct saturation of the colors, the brightness signal in the color channel may be completed balanced out and the entire frequency range of brightness signals is added to form the composite video signal in place of the mixed highs signal.

The various devices and techniques employed at that transmitter in the development of a composite color video signal in accordance with this invention may also be employed at the receiver. It will be understood that whatever one of the different forms of the invention is employed at the transmitter the corresponding steps are required to be taken at the receiver.

The novel features that are considered characteristic of this invention are set forth with particularity in the appended claims. The invention itself, however, both as to its organization and method of operation, as well as additional objects and advantages thereof, will best be understood from the following description when read in connection with the accompanying drawings.

Figure 1:
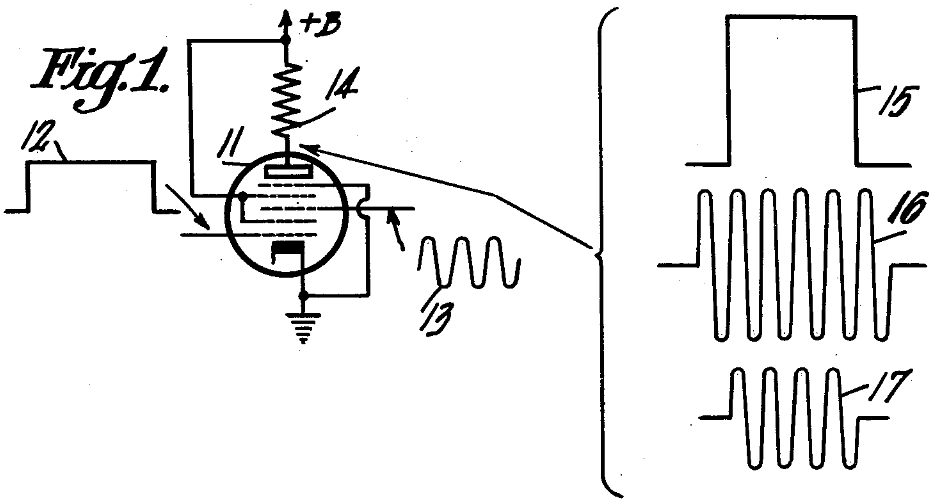
Figures 1, 2 and 3 are curves representing different wave forms which will be referred to for the purpose of providing a better understanding of the type of signals employed in such a system and the manner in which they become altered so as to convey the correct information.

The present invention may be understood better by first considering some of the background. One convenient type of apparatus used for the modulation of the color carrier wave includes, for each color representative video signal, as shown in Figure 1, a converter type tube 11 having the video signal 12 impressed upon one of its control grids and the particular phase of the color carrier wave 13 upon another one of its control grids. As a result, there is produced in the plate circuit of such a tube, signal effects having three different components. One component is the amplified video signal 15 impressed upon one of the control grids such as would be produced in the absence of any color carrier wave voltage impressed upon the other control grid. A second component is an amplified color carrier wave 16 such as would be produced alone if the video signal were not impressed upon one of the control grids of the tube. The third component is the product 17 of the modulation of the carrier wave by the video signals and consists of the sum and difference frequencies caused by the multiplication of the two signals impressed upon the control grids. It is only the latter component which it is desired to obtain.

The output circuits of the modulator tubes are coupled together. Since the color carrier wave usually is impressed upon the three modulator tubes, such as would be used in a three-color system in 120 degree phase displacement, it is seen that, in the combined output circuit, the color carrier wave component is balanced out. The different color representative video signals, however, bear no particular relationship to one another as in the case of the color carrier wave component and may not be eliminated from the common output circuit by ordinary means. These latter signals, however, are effectively eliminated, or are controlled suitably to produce compensated color video signals, by means of the present invention.

Figure 2:
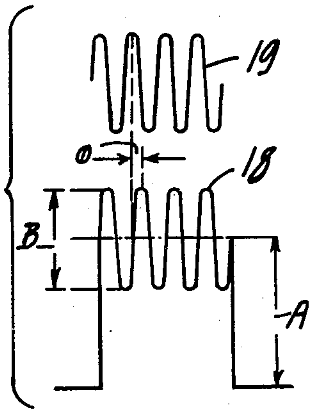

In order to fully appreciate the difficulties encountered in the use of modulators of the general character referred to, a brief consideration will be given to the different signal effects which it is desired to produce and to their relationship to one another. For this purpose, reference is made to Figure 2 of the drawings. The wave 18 is a portion of the color carrier wave referred to. The hue which this wave represents is determined by the phase of the wave relative to a reference frequency wave 19. This phase relationship is indicated in the drawing by the angle $\phi$. The peak-to-peak amplitude B of the wave 18 is proportional to the value, or intensity, of the light of the hue represented by the angle $\phi$. Displacement A of the AC axis of the wave 18 from a reference potential, such as that representing black, is proportional to the total brightness of that portion of the subject which is represented by the signal. The saturation, or chroma, of the color represented by this signal is proportional to the ratio B/A. The conventional modulator apparatus such as described previously with reference to Figure 1 does not, in all cases, produce signals having the desired ratio of the peak-to-peak amplitude of the color carrier wave to the displacement of the AC axis of the wave from a reference potential, such as that represented by picture black. The reason for this is that, in the converter type of modulator tube which is particularly well adapted for use in such modulators, the No. 1 grid upon which the video signal is impressed generally is about three times more effective at amplifying the video signal that it is in multiplying the video signal with the color carrier wave impressed upon the No. 3 grid.

Figure 3:
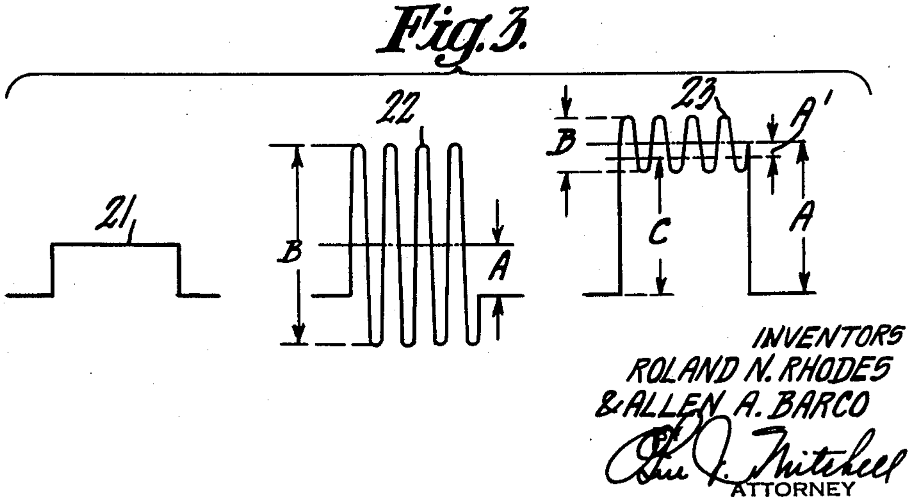

This effect is illustrated in Figure 3 to which reference now will be made. The video signal 21 represents all of the light of one color derived from one of the subject areas. If it be assumed that the light from this area is, as in most cases, slightly less than completely saturated, then part of the amplitude of the video signal 21 represents some light of the particular hue which, when added to substantially equal quantities of light of the other subject colors, produces effectively white light by which the dominant hue is diluted to produce a partially saturated color. The signal transfer devices such as ordinarily used in color television systems are capable of determining this light ratio by themselves. It becomes necessary then to provide a modulator which, in response to a signal which is represented at 21, will produce a color carrier wave having the desired ratio of peak-to-peak amplitude to the displacement of the AC axis of the wave to the reference potential.

Assume that the curve 22 represents an output signal which it is desired to derive from a modulator for a highly saturated color area of the subject. It is seen that the peak-to-peak amplitude B of the carrier wave is large relative to the displacement A of the AC axis of the wave from the reference black representative potential. In view of the inherent properties of the type of modulator tube which it is desired to employ for other reasons, there is produced in the output circuit a wave such as shown at 23 of this figure. It is seen that the video signal 21 is amplified to a considerable extent such as represented at A. The multiplication of the video signal and the carrier frequency wave, however, produces and AC component of the signal 23 having a relatively small peak-to-peak amplitude, Consequently, the signal 23, if used for image reproduction, would produce a color having entirely too low a saturation such as represented by the ratio of B/A.

It is necessary, therefore, to eliminate by some means enough of the brightness information from the resultant signal 23 to produce the desired ratio of B/A. Such a process is indicated generally in Figure 3 by considering that brightness information in magnitude, represented by C, is subtracted from the signal 23. This, in effect, displaces the AC axis of the carrier wave by an amount $A_1$ from the reference potential. It is seen that the resultant signal has the desired ratio of $B/A_1$ which is representative of the correct saturation of the color. The resultant signal may be amplified, if necessary, for subsequent utilization.

Heretofore, it has been common practice to remove the brightness information from the color channel by including a low pass filter having a range from zero to approximately one-half of the color carrier wave frequency in the modulator input circuits. The different color video signal modulated phases of the color carrier wave produced by the modulators are combined in the common output circuit of the modulators in a high pass filter having a range extending upwards of from approximately one-half of the carrier wave frequency. If the characteristics of the described combination of low pass and high pass filter overlap to any extent, video signals in the input circuits of the modulator having frequencies within the overlapping region will not be attenuated to the same degree as signals having frequencies in the remainder of the spectrum. Consequently, when such signals are added to the brightness signal, a spurious resultant signal is produced.

It is desirable, therefore, to have as little overlapping of the low pass and high pass filter characteristics as possible. Consequently, the upper frequency cutoff of the low pass filter and the lower frequency cutoff of the high pass filter are suitably chosen to effect this result. By designing the filter in this manner, its effective band width for the color signal video signals is limited to an extent greater than desired. Furthermore, the low pass filter and high pass filter used in such arrangements must not only be carefully designed to effect the desired results but also must be tuned with considerable precision. Moreover, the delay in the propagation of the signals through such filters is relatively great because of the comparatively narrow band width thereof. In order to compensate for such a delay it is often necessary to employ a carefully constructed delay line in the brightness signal channel so as to effect the proper combination of the brightness and color signals for transmission to the image reproducing apparatus.

In order to overcome some of the difficulties encountered by reason of the use of the low pass and high pass filter combinations, the use of balanced modulators has been proposed. Previously, more or less conventional types of balanced modulators have been used for such a purpose. It is necessary, however, in order to use the conventional types of balanced modulators for such a purpose, to provide push-pull signals of both the color video and of the color carrier wave. In addition, both of the push-pull video signals must be clamped, or otherwise fixed in level, relative to a reference potential at the transmitter. Consequently, for each of the color representative modulating channels there are required two modulator tubes, two phase inverters and two level setters, or clamping tubes. Furthermore, each of these pairs of tubes must be carefully matched for gain and linearity characteristics.

Figure 4:
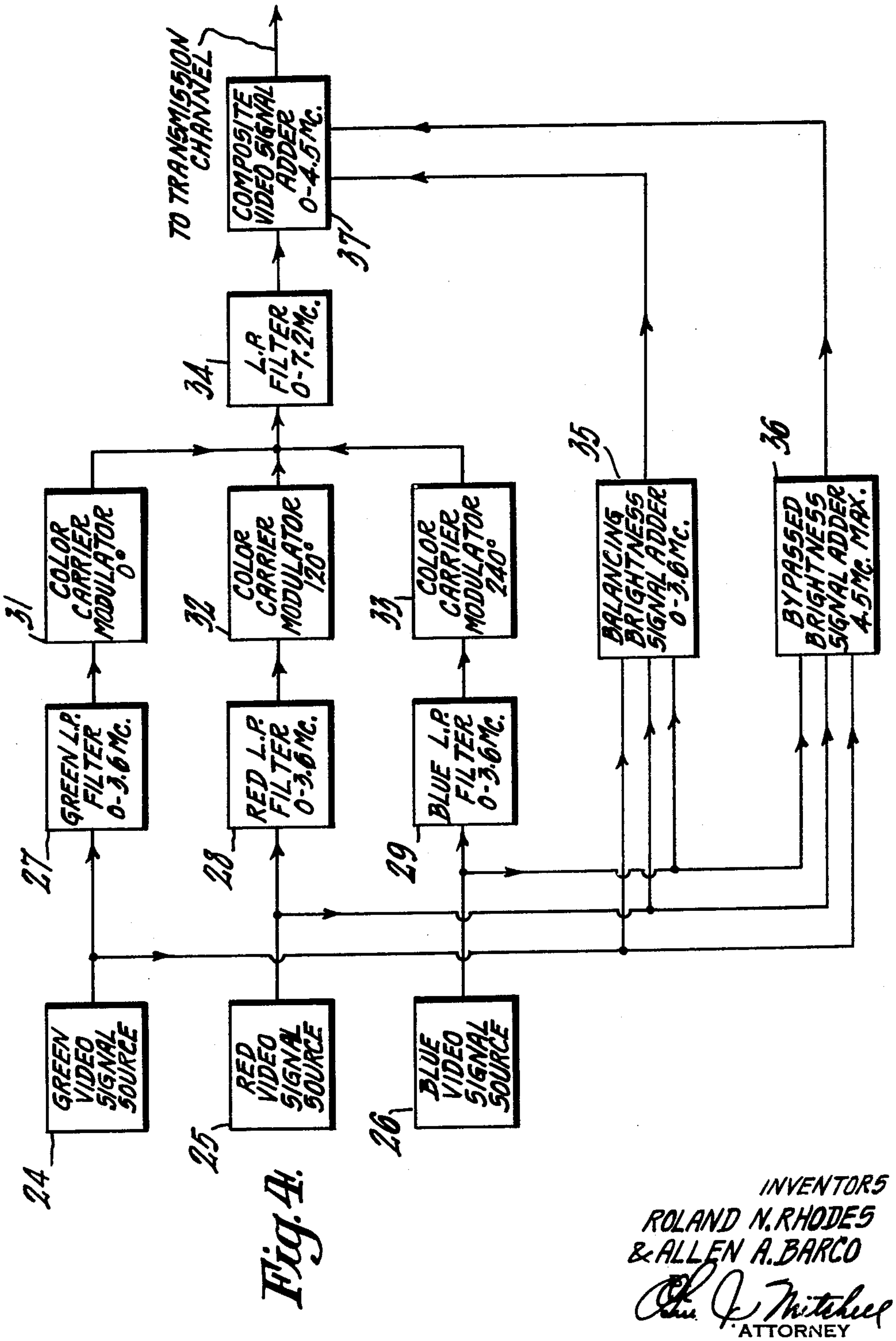
Figure 4 is a block diagram of a representative arrangement of transmitting apparatus in one illustrative embodiment of the invention.

One general arrangement of apparatus in which the present invention may be embodied is shown in Figure 4 to which reference now will be made. Green, red and blue video signal sources 24, 25 and 26 are provided. These may, for example, include color camera apparatus. In any case, it will be understood that signals derived from their respective sources are representative respectively of the total light derived from the subject of the colors indicated. These signals will cover an appreciable frequency range of which only those frequencies up to approximately 4.5 megacycles need be considered for the reason that, ordinarily, this represents approximately the signal transmission capability of the channels in which the color television signals will be conveyed. In accordance with the present invention, the green, red and blue signals derived respectively from the sources 24, 25 and 26 are passed through green, red and blue low pass filters 27, 28 and 29. It is to be noted that these filters pass signals of all frequencies up to approximately the frequency of the color carrier wave which in this case will be assumed to be approximately 3.6 megacycles.

The substantially complete range of color representative video signals derived from the low pass filters 27, 28 and 29 are impressed, respectively, upon the color carrier wave modulators 31, 32 and 33. These modulators may be of the general type previously described. In any case, it will be understood that the green, red and blue video signals are employed to modulate respectively three different phases of the color carrier wave. The invention is not restricted to any particular phase relationship of the different color carrier wave components. As an example, however, for the purpose of making the present disclosure clear and definite, it will be assumed that the color carrier wave on which the green signal is modulated has a 0 degree phase and the red and blue color carrier components have −120 degree and −240 degree phases respectively. The outputs of the three modulators 31, 32 and 33 are connected together substantially as shown and to a low pass filter 34 designed to pass all frequencies from zero to approximately twice the frequency of the color carrier wave, which in the assumed case, would be 7.2 megacycles.

The signals derived from the sources 24, 25 and 26 also are added together in a balancing brightness signal adder 35 coupled to the green, red and blue low pass filters 27, 28 and 29 respectively. The balancing brightness signal adder produces a composite signal equal substantially to the arithmetic sum of the different color representative video signals. The brightness signal developed in the adder 35 has a frequency range extending from zero to approximately 3.6 megacycles.

There also may be provided a bypassed brightness signal adder 36 which is coupled to the green, red and blue video signal sources 24, 25 and 26. The bypassed brightness signal adder functions to produce a signal proportional to the arithmetic sum of all of the color video signals in the range from approximately 3.6 to 4.5 megacycles, in the case of one form of the invention being presently considered.

The color representative video signals derived from the low pass filter 34, a predetermined balancing brightness signal derived from the added 35, and a predetermined bypassed brightness signal derived from the adder 36 are impressed upon a composite video signal adder 37. This device functions to add arithmetically the three different signal components to produce a composite video signal representative of the subject whose image it is desired to reproduce. The composite video signal adder is provided with an output which is coupled to any suitable transmission channel as indicated. In the case where the transmission channel is a radio path, the composite video signal is modulated in a conventional manner upon a carrier wave for radiation along with other system control signals such as synchronizing pulses.

If it be assumed that the color representative video signals derived from the modulators 31, 32 and 33 are of the general character as the signal 23 of Figure 3 in which an incorrect saturation of the color may be represented, a suitable amount of the balancing brightness signal derived from the adder 35 is combined with the modulated color carrier wave signal in the adder 37 to produce the desired relationship between the peak-to-peak amplitude of the color carrier wave to the deviation of the AC axis of the wave from the reference potential. As generally indicated in Figure 3, this combining process is the equivalent of subtracting a brightness signal of the magnitude C from the signal 23. By this means a composite video signal in the range of frequencies from zero to approximately 3.6 megacycles is produced.

In order that the image reproduced from the signals developed by apparatus such as shown by Figure 4 be as nearly representative of the original subject as possible, it is desirable to provide in the composite video signal detailed information up to the frequency transmission limits of the channel, which in the assumed case is approximately 4.5 megacycles. Accordingly, a bypassed brightness signal in the frequency range from 3.6 to 4.5 megacycles derived from the adder 36 may be additionally combined in the adder 37 with the composite video signal as described.

An alternative mode of operating the apparatus of Figure 4 is one in which the brightness signal in the output of modulators 31, 32 and 33 is not just sufficiently balanced by the addition of a balancing brightness signal from the adder 35 to produce a signal representative of the correct color saturation. Instead, the brightness signal in the color channel may be completely balanced out by suitable control of the balancing brightness signal adder 35. In such a case, the bypassed brightness signal adder 36 will be required to provide a signal output for the full band width of frequencies from zero to approximately 4.5 megacycles. It will be understood that any other desired intermediate adjustments of the apparatus may be made within the scope of the present invention.

Figure 5:
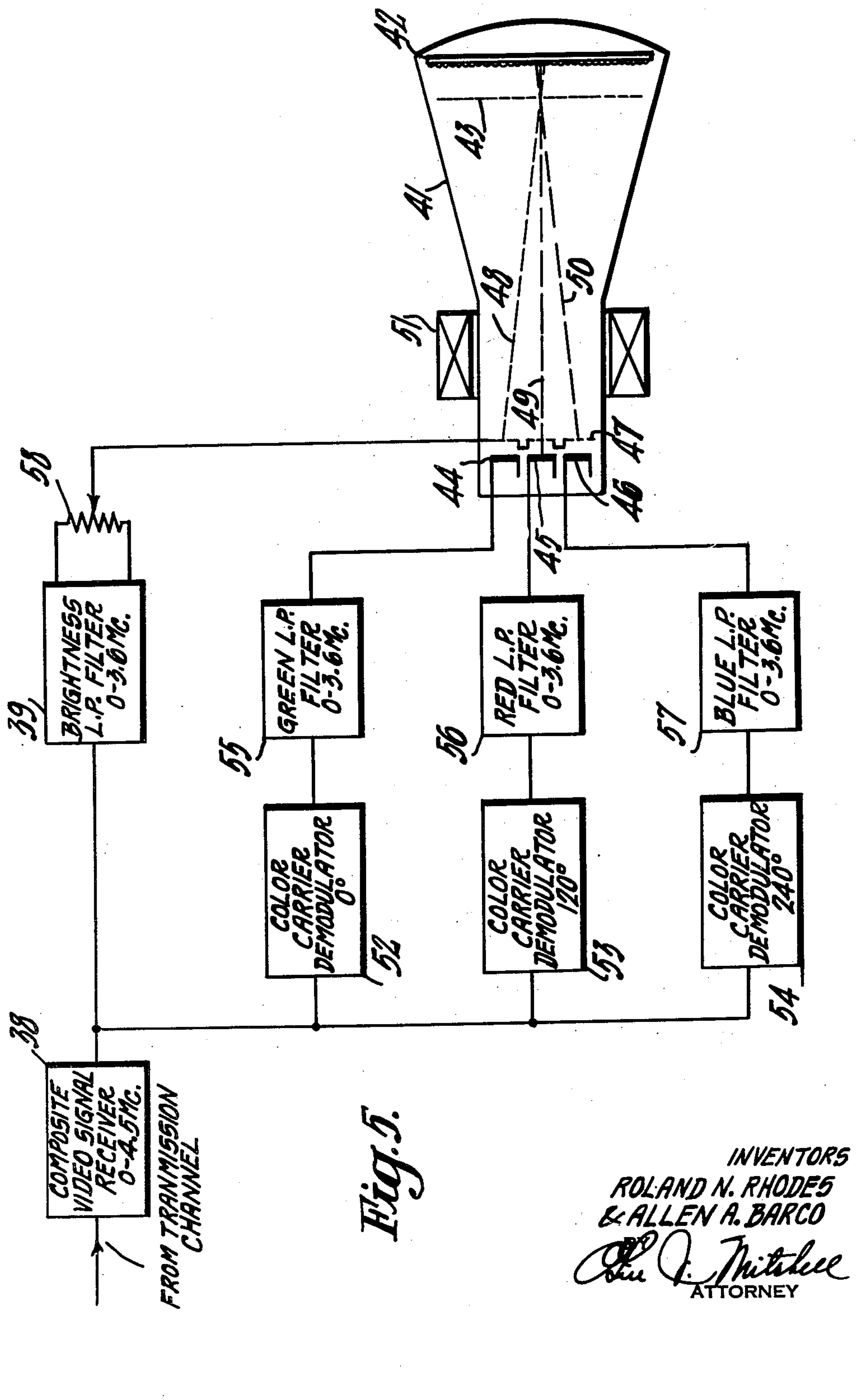
Figure 5 is a block diagram of receiving apparatus embodying the present invention.

Reference now will be made to Figure 5 for a description of a representative type of image reproducing apparatus operating in accordance with the present invention. The composite video signal derived from the transmission channel is impressed upon a composite video signal receiver 38. This receiver has a band width extending from zero to approximately 4.5 megacycles. The composite video signal derived from the receiver 36 is separated into two paths or channels.

The brightness signal channel includes a low pass filter 39 capable of transferring the composite video signal frequencies in the range from zero to 3.6 megacycles. The brightness filter is coupled between the receiver 38 and the electron beam intensity control electrode system of image reproducing apparatus such as a tri-color kinescope 41. The color kinescope is of the general type described in an article titled "General Description of Receivers for the RCA Color Television System Which Employ Direct-View Color Kinescopes" published in the RCA Review, volume XI, No. 2, June 1950 at pages 228 to 232. Such a tube also forms the subject matter of a copending application of Alfred C. Schroeder, Serial No. 730,637 filed February 24, 1947, now Patent No. 2,595,548, granted May 6, 1952, and titled "Picture Reproducing Apparatus."

The kinescope 41 is provided with a substantially flat luminescent screen 42 having a multiplicity of small phosphor areas arranged in groups and capable respectively of producing light of the different primary colors in which the image is to be reproduced when excited by an electron beam. In back of, and spaced from, the screen 42 there is an apertured masking electrode 43 having an aperture for, and in alignment with, each group of phosphor areas of the screen 42. The kinescope also has a plurality of electron guns equal in number to the number of primary colors in which the image is to be reproduced. The electron guns are provided respectively with cathodes 44, 45 and 46 with which are associated respective intensity control grids, but which will be referred to in this case as a common control grid 47 because of the electrical connection between the individual grids. The three electron guns produce beams 48, 49 and 50 by which to energize respectively the green, red and blue phosphor areas of the screen 42. The electron beams traveling different paths from their respective guns are suitably controlled by suitable apparatus (not shown) so that they converge in the plane of the masking electron 43. Accordingly, all three of the electron beams 48, 49 and 50 pass through the apertures of the masking electrode from different directions and impinge upon different phosphor areas of the groups so as to produce green, red and blue light.

The color kinescope also is provided with a deflection yoke 51 for the purpose of deflecting the beams 48, 49 and 50 over the target electrode structure so as to scan the usual rectangular raster. The details of the deflection yoke and the means for energizing it may be entirely conventional and accordingly, are not specifically shown herein since they form no part of the present invention.

The output of the brightness filter 39 in this illustrated form of the invention is coupled to the common control grid 47 of the color kinescope 41. The cathodes 44, 45 and 46 of the color kinescope electron guns are coupled respectively to the green, red and blue video signal demodulating channels respectively.

The color channel of the image reproducing apparatus which is derived from the composite video signal receiver 38 includes carrier wave demodulators 52, 53 and 54 respectively capable of operating at 0 degrees, −120 degrees and −240 degrees for the individual demodulation of the green, red and blue color representative video signals. The outputs of the demodulators 52, 53 and 54 are coupled respectively to green, red and blue low pass filters 55, 56 and 57 which, in turn, are coupled respectively to the kinescope cathodes 44, 45 and 46. These low pass filters are of a character to transfer the individual color representative video signals in the frequency range from zero to approximately 3.6 megacycles to the color kinescope 41. In order to impress the received composite video signals properly upon the color kinescope electron guns to reproduce the colors with the desired saturation, the brightness signal which is bypassed around the color carrier wave demodulating apparatus may be suitably adjusted in amplitude by means such as a potentiometer 58 in the output circuit of the brightness filter 39.

Figure 6:
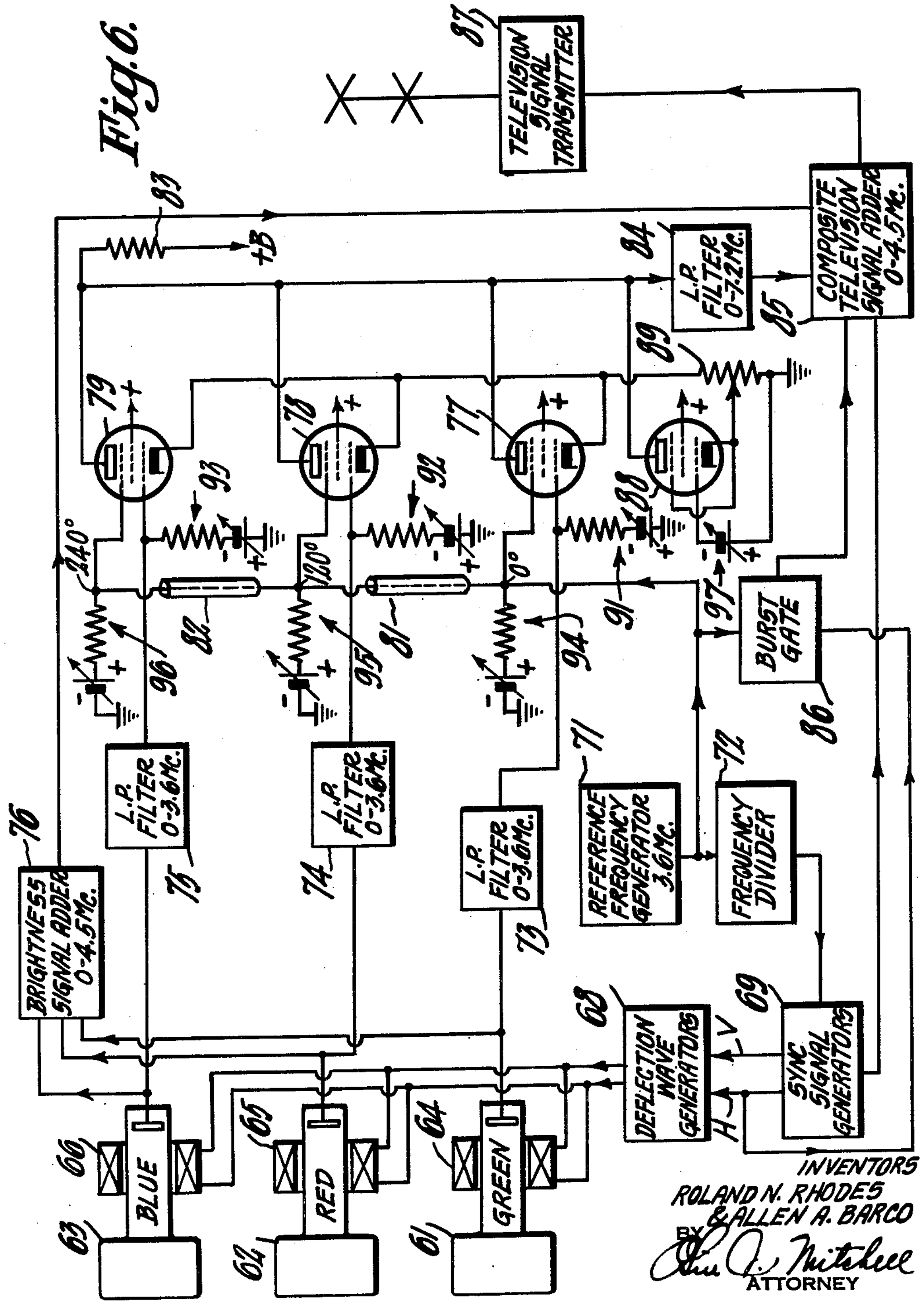
Figure 6 is a diagram, mostly in block form, of transmitting apparatus embodying a particular form of the invention shown in somewhat greater circuit detail.

Reference now will be made to Figure 6 for a description of a particular embodiment of the described general principles underlying the present invention which has been successfully employed. The color video signal sources, in this case, are camera tubes 61, 62 and 63 which are responsive, respectively, to green, red and blue light derived from the subject. The camera tubes may be of any conventional type, such as for example, the well known image orthicon. The camera tubes 61, 62 and 63 are provided respectively with deflection yokes 64, 65 and 66 for the usual purposes of deflecting the electron scanning beams to generate the different color representative video signals. The deflection yokes are energized by substantially sawtooth wave energy derived from deflection wave generators 68. These generators in turn are properly timed by means of synchronizing signal pulses derived from the usual sync signal generators 69.

In the present case, the system includes a reference frequency generator 71 having a frequency of approximately 3.6 megacycles, or one having a predetermined relationship to the deflection frequencies. For other purposes, an understanding of which is not required to comprehend the present invention, the frequency of the reference frequency generator should be an odd multiple of one-half the horizontal, or line scanning, frequency. In a particular instance, in which it is approximately equal to 3.6 megacycles, it may for example have a frequency equal to 3.583,125 cycles per second. The output of the generator 71 is coupled to a frequency divider 72 which produces the conventional horizontal and vertical deflection frequencies and impresses them upon the sync signal generators 69 in order to properly control the impulses developed thereby.

The video signal output electrodes of the camera tubes 61, 62 and 63 are coupled respectively to low pass filters 73, 74 and 75. Each of these filters is designed to transfer signals in the frequency range from zero to approximately 3.6 megacycles. In addition, the video signal output electrodes of the camera tubes are coupled to a brightness signal adder 76 in which an arithmetic addition of the three color representative video signals is made in a range of frequencies extending from zero to approximately 4.5.

The green, red and blue color representative video signals derived respectively from the low pass filters 73, 74 and 75 are impressed upon the No. 1 grids of three modulator tubes 77, 78 and 79. These tubes may be conventional mixer type tubes such as 6SA7's for example. The No. 3 grids of these tubes are energized by three different phases of the reference frequency wave derived from the generator 71. This reference frequency wave is impressed upon the modulator tube 77 in zero degree phase and, by means of a suitable delay line 81, is impressed upon the tube 78 in —120 degree phase. Similarly, the reference frequency wave is impressed upon the tube 79 in —240 degree phase by means of a suitable delay line 82. By means of the described arrangement whereby the different color representative video signals and the different phases of the reference frequency wave are impressed respectively upon the tubes 77, 78 and 79, the different carrier wave phases are modulated respectively in phase and in amplitude in accordance with the green, red and blue video signals.

The anodes of the modulator tubes 77, 78 and 79 are connected together and through a common load resistor 83 to a suitable source of space current indicated at +B. In this manner, the different carrier wave phases modulated by the respective color representative video signals are produced in a common output circuit which is coupled to a low pass filter 84. This filter is designed to pass substantially the entire range of frequencies including the color carrier wave and both of its modulation side bands and accordingly has a pass band from zero to 7.2 megacycles. The output of the filter 84 is coupled to a composite television signal adder 85 which also is coupled to the brightness signal adder 76 so that a composite video signal is developed including the total brightness signal and color representative phase- and amplitude-modulated sub-carrier wave.

In order that receiving apparatus, which may be used to reproduce an image from the composite video signal generated by the transmitting apparatus of Figure 6, be capable of operating synchronously with the transmitting apparatus, it is necessary to transmit suitable synchronizing information. In order to effect deflection of the electron beam or beams of an image reproducing kinescope such as the color kinescope 41 of Figure 5, for example, to scan the usual raster, there is transmitted, as a part of the conventional composite television signal, horizontal and vertical synchronizing pulses. For this purpose, the sync signal generators 69 are coupled to the composite signal adder 85 so as to function in the usual conventional manner.

Also, however, it is necessary to suitably synchronize the apparatus used to effect a phase demodulation of the received color carrier wave. For this purpose, there is transmitted, as part of the composite television signal, a burst of energy consisting of several cycles of the color carrier wave frequency. This energy burst is transmitted during the blanking intervals and immediately following the horizontal synchronizing pulses. More complete disclosures of this and other types of synchronizing systems which may be used in the practice of the present invention may be found in a publication titled "Recent Developments in Color Synchronization in the RCA Color Television System" issued February 1950 by Radio Corporation of America. Figure 11 of this publication refers particularly to the transmitter apparatus. The burst type of color synchronizing signal also forms the subject matter of a copending U. S. application of Alda V. Bedford, Ser. No. 143,800 filed February 11, 1950, and tilted "Synchronizing Apparatus."

In accordance with the usual practice, this burst of the color carrier frequency is impressed upon the horizontal blanking pedestal in the so-called "back porch" region. Accordingly, the system embodying the present invention also includes a burst gate apparatus 86 which is coupled between the reference frequency generator 71 and the composite television signal adder 85. It is rendered operative only during the back porch intervals of the composite television signal under the control of horizontal synchronizing pulses derived from the sync signal generators 69. By means of such apparatus, controlled in the manner described, there are impressed periodically upon the composite television signal adder 85 short bursts of energy having the frequency of the color carrier wave.

It will be understood that, so far as the practice of the present invention is concerned, the composite television signal derived from the adder 86 may be conveyed to a suitable image reproducing apparatus by any of the usual means. For example, it may be connected by comparatively short lengths of coaxial cable to monitoring apparatus or the like. In a similar manner, it may be conveyed to a more remote point by a comparatively long cable facility such as those employed in conjunction with the network type of transmission. However, the invention probably will be used more extensively in such types of operation where the television signal derived from the signal 85 is conveyed to the image reproducing apparent by a radio channel. In such a case, the adder 85 may be coupled to a television transmitter 87. It will be understood that the transmitter may be conventional, including facilities for modulating a main carrier wave by means of the composite television signal for radiation into space.

With the transmitter apparatus of the character described, there also is employed, in accordance with the present invention, a balancing electron tube 88. Preferably, this tube is of the multigrid type such as used for signal mixing and/or frequency conversion and may be similar to the modulation tubes 77, 78 and 79, which as indicated, may be 6SA7's for example. The balancing tube 88 is operated as a grounded grid amplifier. The cathodes of the modulator tubes 77, 78 and 79 are connected together and through a relatively low impedance resistor 89 to ground. The cathode of the balancing tube 88 is coupled to a suitable variable point on the resistor 89. The anode of the tube 88 is connected to the anodes of the modulator tubes. It is seen that, by reason of the described connections, any signal voltages developed in the resistor 89 are amplified by the tube 88 and combined with the signal voltages in the anode circuits of the modulator tubes in reverse polarity, thereby balancing out signal components common to both anode and cathode circuits of the modulator tubes.

The No. 1 grid circuits of the modulator tubes 77, 78 and 79 are provided respectively with variable biasing facilities 91, 92 and 93. Similarly, the No. 3 grid circuits of the tubes 77, 78 and 79 are provided respectively with variable biasing facilities 94, 95 and 96. Also, the No. 1 or control grid of the balancing tube 88 is provided with a variable biasing facility 97.

The described color controlling apparatus shown in Figure 6 operates substantially in the following manner. The net voltage on each of the No. 1 grids of the modulators 77, 78 and 79 is equal substantially to the individual input video signal voltages minus the voltage developed across the resistor 89 as a result of a current flowing therein equal in magnitude to the sum of the cathode currents of the three tubes. In view of the described relatively low impedance of the resistor 89 it will be understood that this developed voltage also is relatively small. As a consequence, it is seen that each of the tubes 77, 78 and 79 operates substantially independently of the other two.

It also will be appreciated that the anode current of each of the modulator tubes 77, 78 and 79 consists of the sum of the three components previously referred to in the description relating to Figure 1. One of these components is the amplified video signal impressed upon the No. 1 grid of any of these tubes. The second component is the color carrier wave which is impressed upon the No. 3 grid. The third component comprises the products of modulation of the first two components. It is only the latter component which it is desired to utilize. It, therefore, is necessary to isolate it from the others. One way of effecting this result is to remove the undesired components.

The carrier wave component may be balanced out of the combined modulator tubes 77, 78 and 79 by suitably manipulating the variable biasing facilities 91, 92 and 93. The carrier frequency component may be balanced out by this means because of the described phase relationship of the reference frequency wave which is impressed upon the modulator tubes. In other words, because of the chosen phase relationship, it is seen that the vector sum of the reference or color carrier frequency wave currents produced in the anode circuits of the three modulator tubes is zero.

The balancing tube 88 serves the purpose of removing, or rendering ineffective, the unmodulated anode currents corresponding to the individual video input signals to the No. 1 grids of the modulator tubes. When the modulator tubes are operated in the manner shown in Figure 6 and in the manner described, the anode currents of the tubes are almost identical to the cathode currents except that the anode currents are somewhat smaller in amplitude. This difference in amplitude is caused by the fact that a substantial portion of the cathode current goes to the screen grids of the tubes and therefore does not reach the tube anodes. It is seen that the voltage which is impressed upon the balancing tube 88 from the resistor 89 is proportional to the sum of the cathode currents of the modulator tubes 77, 78 and 79. As previously indicated, by virtue of the manner in which the balancing tube 88 is coupled with the other apparatus, the anode current of this tube is of opposite polarity to the sum of the unmodulated currents in the anodes of the modulator tubes. Consequently, the current in the anode circuit of the tube 88 may be suitably adjusted, by proper choice of the point on the resistor 89 to which the cathode is connected, to balance out the undesired unmodulated anode currents of the modulator tubes.

It, thus, is seen that both of the undesired components produced in the output circuit of the modulator tubes 77, 78 and 79 may be balanced out by the means described, leaving currents representing the desired products of modulation to develop the proper color video signal voltage across the load resistor 83. In operation of the device described, the variable biasing facilities 94, 95 and 96 provided for the No. 3 grids of the modulator tubes may be manipulated suitably to provide similar divisions of anode and screen grid currents in the three modulator tubes, thereby equalizing the operating characteristics of these tubes. The variable biasing facilities 97 provided with the tube 88 provide a control for this tube, whereby it may be operated with the proper amplitude linearity characteristic.

It may be seen from the foregoing description of the present invention that it provides several advantages over prior art arrangements. Contrary to the requirements for conventional balanced modulators, the present arrangement is of such a character that all of the input circuits may be single ended. Such an arrangement enables a considerable simplification in the number of components and the circuits which are required. Another advantage is that the modulator tubes, such as 77, 78 and 79, do not have to be tubes which are identical in their operating characteristics. There also is no limitation on the signal amplitudes which may be employed, because any distortion which may be introduced is also reproduced by the balancing tube 88 and hence, will be balanced out along with the other undesired components. Furthermore, the principle of operation upon which the present invention depends is not necessarily limited to three phase operation. Also, only one tube is required for each phase of the color carrier wave to be modulated.

The nature of the invention may be ascertained from the foregoing description. The scope of the invention is set forth in the appended claims.

What is claimed is:

1. In a color television system of the type in which a composite video signal includes one component varying in amplitude and within a predetermined band of frequencies to represent brightness of a subject and another component comprises a color carrier wave having one of said brightness signal frequencies and varying in phase and amplitude respectively to represent hue and chroma of said subject, color-controlling apparatus comprising, a color signal channel conveying said color-representative signals within a band of frequencies of which the highest is approximately equal to said color carrier wave frequency, a balancing brightness signal channel conveying brightness-representative signals within a band of frequencies equal substantially to said color signal channel frequency band, a bypassed brightness signal channel conveying a combination of all of said color-representative video signals within a band of frequencies ranging up to the highest frequency of said video frequency band, means associated with one of said channels to develop a signal effect representative of any undesired brightness signal in said color channel, compensating means coupled to said color channel and responsive to said developed signal effect to control the magnitude of said brightness signal in said color channel, whereby to produce a compensated color video signal component, and means including a composite video signal adder coupled to said color, balancing brightness and bypassed brightness signal channels to combine a desired portion of said bypassed brightness signal with said compensated color signal, whereby to develop a composite video signal accurately representative of said subject.

2. In a color television system, color-controlling apparatus as defined in claim 1 wherein, said compensating means is susceptible of variable control to a degree whereby the brightness signal in said color channel is balanced to an extent at which said color signals have the desired saturation, and said bypassed brightness signal channel has a lower cutoff frequency approximately equal to said color carrier wave frequency.

3. In a color television system, color-controlling apparatus as defined in claim 1 wherein, said compensating means is susceptible of variable control to a limit whereby the brightness signal is substantially eliminated from said color channel, and said bypassed brightness signal channel has a lower cutoff frequency substantially equal to zero.

4. In a color television system of the type in which a composite video signal includes one component varying in amplitude and within a predetermined band of frequencies to represent brightness of a subject and another component comprises a color carrier wave having one of said brightness signal frequencies and varying in phase and amplitude respectively to represent hue and chroma of said subject, color-controlling apparatus comprising, a color video signal channel conveying said phase- and amplitude-modulated color carrier wave component, said color signal channel including a plurality of different color video signal-conveying electron tubes, each of said tubes having a cathode, an anode and at least one grid electrode, means impressing said color-representative video signals respectively upon said grid electrodes, an undesired brightness signal-adding circuit coupled to said cathodes, and compensating means coupled between said brightness-signal adding circuit and said anodes to compensate for any undesired brightness signals in said color channel.

5. In a color television system, color-controlling apparatus as defined in claim 4 wherein, said compensating means includes an electron tube having an anode coupled to the anodes of said signal-conveying tubes and cathode and grid electrodes coupled to said brightness signal-adding circuit.

6. In a color television system of the type in which a composite video signal includes one component varying in amplitude and within a predetermined band of frequencies to represent brightness of a subject and another component comprises a color carrier wave having one of said brightness signal frequencies and varying in phase and amplitude respectively to represent hue and chroma of said subject, color-controlling apparatus comprising, a color video signal channel conveying said phase- and amplitude-modulated color carrier wave component, a brightness video signal channel conveying said varying amplitude brightness component, said color signal channel including a signal mixing electron tube for each of the primary colors of said subject, each of said tubes having a cathode, an anode and two grid electrodes, means impressing said color-representative video signals respectively upon corresponding grids of said mixing tubes, means impressing different phases of said color carrier wave upon other corresponding grids of said mixing tubes, a relatively low impedance circuit coupled to the cathodes of all of said mixing tubes, and a balancing electron tube having a cathode coupled to said low impedance circuit, a control grid operated at a fixed signal potential and an anode coupled to said mixing tube anodes, whereby to compensate for any undesired brightness signals in said color channel.

7. In a color television system of the type in which a composite video signal includes one component varying in amplitude and within a predetermined band of frequencies to represent brightness of a subject and another component comprises a color carrier wave having one of said brightness signal frequencies and varying in phase and amplitude respectively to represent hue and chroma of said subject, color-controlling apparatus comprising, a color video signal channel conveying said phase- and amplitude-modulated color carrier wave component, a brightness video signal channel conveying said varying amplitude brightness component, said color signal channel including a color carrier wave modulating electron tube for each of the primary colors of said subject, each of said tubes having a cathode, an anode and two grid electrodes, means impressing said color-representative video signal respectively upon one set of corresponding grids of said modulating tubes, means impressing different phases of said color carrier wave upon the other set of corresponding grids of said modulating tubes, a common output circuit coupled to the anodes of said modulating tubes, a relatively low resistor coupled to the cathodes of all of said modulating tubes, and a balancing electron tube having a cathode, an anode and a grid electrode, means coupling said balancing tube cathode to said resistor, means impressing a unidirectional potential upon said balancing tube grid electrode, and means coupling said balancing tube anode to said common output circuit, whereby to compensate for any undesired brightness signals in said color channel.

8. In a color television system, color-controlling apparatus as defined in claim 7 wherein, said balancing tube cathode coupling means includes a movable contact on said resistor, whereby to variably control said brightness signal compensation in said color channel.

9. In a color television system, color-controlling apparatus as defined in claim 7 wherein, said one set of corresponding modulating tube grids are provided with respective variable biasing facilities, whereby to control the balancing out of said color carrier wave component in said common output circuit.

10. In a color television system, color-controlling apparatus as defined in claim 7 wherein, each of said modulating tubes is provided with a screen grid interposed between said video signal-receiving and color carrier wave-receiving grids, and said color carrier wave-receiving grids are provided with respective variable biasing facilities, whereby to effect similar divisions of anode and screen grid currents in said modulating tubes and hence to equalize the operating characteristics of said modulating tubes.

11. In a color television system, color-controlling apparatus as defined in claim 7 wherein, said balancing tube grid electrode is provided with variable biasing facilities, whereby to operate said balancing tube with the proper amplitude linearity characteristic.

12. In a color television system of the type in which a composite video signal includes one component varying in amplitude and within a predetermined band of frequencies to represent brightness of a subject and another component comprises a color carrier wave having one of said brightness signal frequencies and varying in phase and amplitude respectively to represent hue and chroma of said subject, color-controlling apparatus comprising, a color video signal channel conveying said phase- and amplitude-modulated color carrier wave component, a brightness video signal channel conveying said varying amplitude brightness component, said color signal channel including a color carrier wave modulating electron tube for each of the primary colors of said subject, each of said tubes having a cathode, an anode, two input grid electrodes and a screen grid interposed between said input grids, means impressing said color-representative video signals respectively upon one set of corresponding input grids, means impressing different phases of said color carrier wave upon the other set of corresponding input grids, a common output circuit including a load impedance device coupled to the anodes of said modulating tubes, a relatively low resistor coupled to the cathodes of all of said modulating tubes, a balancing electron tube having a cathode coupled to a variable point on said resistor, a grid electrode coupled to a variable unidirectional source, and an anode coupled to said common output circuit, variable biasing facilities coupled to said respective video signal-receiving input grids of said modulating tubes to control the balancing out of said color carrier wave component in said common output circuit, and additional variable biasing facilities coupled to said respective color carrier wave-receiving input grids of said modulating tubes to effect similar divisions of anode and screen grid currents in said modulating tubes.

References Cited in the file of this patent

UNITED STATES PATENTS

| | | |
|---|---|---|
| 2,492,926 | Valensi | Dec. 27, 1949 |
| 2,558,489 | Kalfaian | June 26, 1951 |
| 2,567,040 | Sziklai | Sept. 4, 1951 |